United States Patent [19]

Ueda et al.

[11] Patent Number: 5,910,807

[45] Date of Patent: Jun. 8, 1999

[54] METHOD OF DRAWING FIGURE SUCH AS POLYGON AND DISPLAY CONTROL DEVICE

[75] Inventors: Naoki Ueda; Tadayuki Noguchi; Shuji Sakai; Kuniaki Tanaka, all of Hyogo; Yoshiaki Kittaka, Tokyo, all of Japan

[73] Assignees: Mitsubishi Denki Kabushiki Kaisha, Tokyo; Mitsubishi Electric Semiconductor Software Co., Ltd., Hyogo, both of Japan

[21] Appl. No.: 08/804,506

[22] Filed: Feb. 24, 1997

[30] Foreign Application Priority Data

Aug. 9, 1996 [JP] Japan ................................. 8-211515

[51] Int. Cl.[6] ....................................................... G09G 5/36
[52] U.S. Cl. ............................................ 345/515; 345/441
[58] Field of Search ................................... 345/441, 443, 345/418, 507, 509, 515

[56] References Cited

U.S. PATENT DOCUMENTS

| 4,626,838 | 12/1986 | Tsujioka et al. | 345/509 |
| 4,646,076 | 2/1987 | Wiedenman et al. | 345/433 |
| 4,763,119 | 8/1988 | Matsubara et al. | 345/433 |
| 4,914,729 | 4/1990 | Omori et al. | 345/418 |

FOREIGN PATENT DOCUMENTS

| 54-81729 | 6/1979 | Japan . |
| 55-10656 | 1/1980 | Japan . |
| 55-3069 | 1/1980 | Japan . |
| 62-99876 | 5/1987 | Japan . |
| 2-211522 | 8/1990 | Japan . |
| 5-73693 | 3/1993 | Japan . |

OTHER PUBLICATIONS

Foley, J. D., Van Dam A., Computer Graphics: Principles and Practice, Addison–Wesley, pp. 92–99, 1987.

Primary Examiner—Kee M. Tung
Assistant Examiner—Sy D. Luu
Attorney, Agent, or Firm—McDermott, Will & Emery

[57] ABSTRACT

A display control device comprises a work memory including at least a plurality of memory bits each for storing one-bit data indicating whether or not each pixel is inside a figure of plane geometry having a contour such as a polygon, a control unit for scanning each of a plurality of raster scan lines and searching for at least one pixel which can be assumed to form a line segment which partially constructs the contour of the figure so as to generate a control signal for controlling bit inversion to determine the inside of the figure, a selecting unit for receiving the one-bit data of each pixel which is sequentially delivered by the work memory and inverting the one-bit data so as to select one from among the original one-bit data and the inverted one-bit data according to the control signal from the control unit, and output the selected data; a unit for writing the selected data from the selecting unit into a corresponding one of the plural memory bits of the work memory.

6 Claims, 6 Drawing Sheets

(PRIOR ART)(PRIOR ART)(PRIOR ART)

METHOD OF DRAWING FIGURE SUCH AS POLYGON AND DISPLAY CONTROL DEVICE

BACKGROUND OF THE INVENTION

1. Field of the Invention

The present invention relates to a method and a device for drawing a figure of plane geometry such as a polygon and more particularly to a method of determining the inside of a figure of plane geometry to be drawn so as to perform graphical processing on the inside of the figure, e.g., fill the inside of the figure with a predetermined color, and a display control device such as a graphics accelerator board, for implementing the method.

2. Description of the Prior Art

A prior art drawing method implemented via software bears the burden of determining whether or not each pixel is located inside or within a figure of plane geometry having a contour, such as a polygon, and filling such a polygon region with a color.

Such a drawing software program is executed as follows:

(1) draw the contour of a figure of plane geometry (2) determine whether or not each dot on the screen is located within the figure (3) determine whether or not each dot or pixel should be drawn In the case of drawing each dot or pixel on a computer screen, data including color information is the target of drawing processing.

Referring now to FIGS. 9a to 9c, they illustrate views showing such a prior art drawing method implemented via software as mentioned above. According to the method, for example, as shown in FIG. 9a, a representation of the contour of a polygon can be achieved by drawing the line segments connected between a vertex 1 and another vertex 2, between the vertex 2 and another vertex 3, between the vertex 3 and another vertex 4, between the vertex 4 and another vertex 5, between the vertex 5 and another vertex 6, and between the vertex 6 and the vertex 1, sequentially. Then, a point 444 located within the contour of the polygon is colored with a predetermined color, as shown in FIG. 9b. The filling-in operation for the point 444 is carried out while whether or not the point is located within each of line segments which form the contour of the polygon is determined. That is, the determination is carried out as follows; whether or not one point 444 is located within the line segment connected between the vertexes 1 and 2, whether or not the target point is located within the line segment connected between the vertexes 2 and 3, whether or not the point is located within the line segment connected between the vertexes 3 and 4, whether or not the point is located within the line segment connected between the vertexes 4 and 5, whether or not the point is located within the line segment connected between the vertexes 5 and 6, and whether or not the point is located within the line segment connected between the vertexes 6 and 1 are determined sequentially. Then, if it is determined that the point is inside the polygon, the point 444 is filled in with a predetermined color.

There can be provided a method of determining whether each dot is located inside or outside a figure of plane geometry, comprising steps of selecting x or y coordinates of two points A and B from data (e.g. x and y coordinates) showing line segments which construct the contour of the figure of plane geometry, determining whether or not x or y coordinate of each dot is between the x or y coordinates of the two points, assuming that the point can be within the polygon if the x or y coordinate of the dot is between the x or y coordinates of the two points, and repeating the above steps for two points of each of the remaining line segments until it is concluded that the dot is inside or outside the polygon. As a result, the solid figure which is filled in with a predetermined color can be obtained as shown in FIG. 9c.

Drawing data thus obtained by calculations using a CPU are written into a memory device 111, which will be referred to as a frame memory hereinafter, for storing graphics data of a two-dimensional array in synchronization with a write signal from a display controller 114, as shown in FIG. 10. The graphics data written into the frame memory 111 is converted into an RGB signal within the display controller 114. The converted RGB signal is delivered as a video signal to a display monitor 113 and is displayed as the figure of plane geometry on the screen of the monitor 113.

As previously explained, such a prior art drawing method needs a plurality of steps of drawing the contour of a graphic, determining whether or not each point or each pixel is located inside the contour of the graphic, filling the point with a predetermined color, and writing the data of each pixel into a frame memory. Therefore, a disadvantage is that it is difficult to increase the speed at which a display control device using the prior art drawing method draws a graphic.

SUMMARY OF THE INVENTION

It is therefore an object of the present invention to provide a method of determining the inside of a figure of plane geometry such as a polygon at a high speed and a display control device for implementing the method.

In accordance with one aspect of the present invention, there is provided a method of determining the inside of a figure of plane geometry having a contour such as a polygon, comprising steps of: initializing a single bit plane comprised of a plurality of memory bits each for storing one-bit data of each of a plurality of pixels; scanning each of a plurality of raster scan lines and searching for at least one pixel which can be assumed to form, i.e., partially approximate a line segment which partially constructs the contour of the figure so as to invert the one-bit data of the pixel and also the one-bit data of pixels running behind the former pixel in a direction of raster scanning; writing the inverted one-bit data of these pixels into corresponding ones of the plurality of memory bits in the single bit plane sequentially; scanning again each of the plurality of raster scan lines and searching for at least one other pixel which can be assumed to form another line segment which partially constructs the contour of the figure so as to invert the one-bit data of the other pixel unless the one-bit data of the pixel has been already inverted, and further the one-bit data of pixels running behind the former pixel in the direction of raster scanning; and writing the inverted one-bit data of these pixels into corresponding ones of the plurality of memory bits in the single bit plane sequentially.

In a preferred embodiment of the present invention, a start address which specifies a pixel which can be assumed to form a line segment which partially constructs the contour of the figure is obtained in either of the first and second scanning steps, and whether or not the one-bit data of each pixel on each of the plurality of raster scan lines is to be inverted is determined according to a comparison between an address specifying each pixel and the start address.

In another preferred embodiment of the present invention, there is provided a method of determining the inside of a figure of plane geometry having a contour such as a polygon, comprising steps of: initializing a single bit plane comprised of a plurality of memory bits each for storing one-bit data of each of a plurality of pixels; scanning each of a plurality of raster scan lines and searching for at least one series of continuous pixels which can be assumed to be inside the contour of the figure so as to invert the one-bit data of each pixel included in the series of pixels; and writing the inverted one-bit data of each pixel included in the series of pixels into a corresponding one of the plural memory bits in the single bit plane.

In another preferred embodiment of the present invention, in the scanning and searching step, there are provided a start address which specifies a forward end one of the series of pixels and an end address which specifies a pixel which lies just behind a backward end one of the series of pixels in the direction of raster scanning. Furthermore, whether or not the one-bit data of each pixel on each of the plurality of raster scan lines is to be inverted is determined according to comparisons between an address specifying each pixel and the start and end addresses.

In accordance with another aspect of the present invention, there is provided a display control device comprising: a work memory including at least a plurality of memory bits each for storing one-bit data indicating whether or not each pixel is inside a figure of plane geometry having a contour such as a polygon, a control unit for scanning each of a plurality of raster scan lines and searching for at least one pixel which can be assumed to form a line segment which partially constructs the contour of the figure so as to generate a control signal for controlling bit inversion to determine the inside of the figure, a selecting unit for receiving the one-bit data of each pixel which is sequentially delivered by the work memory and inverting the one-bit data so as to select one from among the original one-bit data and the inverted one-bit data according to the control signal from the control unit, and output the selected data, and a unit for writing the selected data from the selecting unit into a corresponding one of the plural memory bits of the work memory.

In a preferred embodiment of the present invention, the control unit performs the scanning for the plurality of raster scan lines twice, and, in the second scanning, for each of the plurality of raster scan lines, the control unit searches for at least one pixel which can be assumed to form another line segment which partially constructs the contour of the figure other than the line segment which is the target of the first scanning so as to generate and deliver the control signal to the selecting unit.

In another preferred embodiment of the present invention, for each of the plurality of raster scan lines, the control unit obtains a start address which specifies a pixel at a forward end of a series of pixels which can be within the figure, i.e., the one-bit data of which are to be inverted, and compares the start address with an address specifying each pixel on each of the plurality of raster scan lines to output a comparison result as the control signal. Furthermore, the selecting unit selects and outputs the inverted one-bit data when the comparison result shows that the specifying address is equal to or larger than the start address.

In another preferred embodiment of the present invention, for each of the plurality of raster scan lines, the control unit obtains a start address which specifies a pixel at a forward end of a series of pixels which can be within the figure, i.e., the one-bit data of which are to be inverted, further obtains an end address which specifies a pixel which lies just a pixel at the other end of the series of pixels, and compares the start and end addresses with an address specifying each pixel on each of the plurality of raster scan lines to output a comparison result as the control signal. Furthermore, the selecting unit selects and outputs the inverted one-bit data when the comparison result shows that the specifying address is equal to or larger than the start address and is smaller than the end address.

Further objects and advantages of the present invention will be apparent from the following description of the preferred embodiments of the invention as illustrated in the accompanying drawings.

DETAILED DESCRIPTION OF THE PREFERRED EMBODIMENTS

Figure 1:
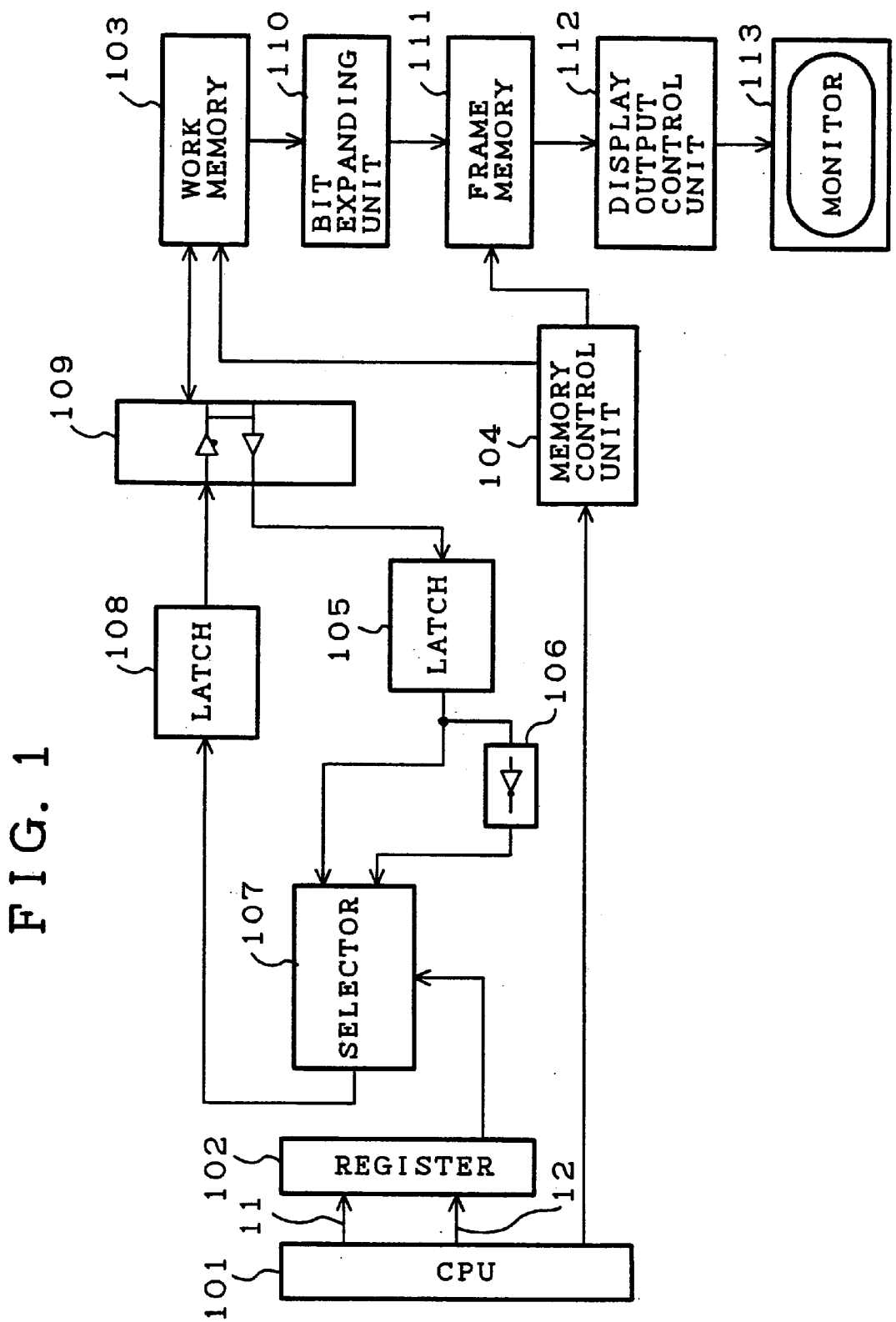
FIG. 1 is a block diagram showing the structure of a display control device according to an embodiment of the present invention.

Referring now to FIG. 1, there is illustrated a block diagram showing the structure of a display control device according to a first embodiment of the present invention. The display control device is provided with a CPU 101 which can execute a software program or the like, a register circuit 102 electrically connected to the CPU 101 by way of a bus, a selector circuit 107 which can receive outputs of a latch circuit 105 and an inverter 106 and which can select either one of the outputs or neither of them, a latch circuit 108 which can latch an output of the selector circuit 107, a work memory 103 comprised of a plurality of memory bits for storing graphics data of a two dimensional array, i.e. a single bit plane (or map) so as to determine the inside of a figure of plane geometry, a bit expanding unit 110 for adding color information or the like to the graphics data stored in the work memory 103, a frame memory 111 for holding the graphics data bit-expanded by the bit expanding unit 110, a bidirectional switching unit 109 for controlling data delivered to and furnished by the work memory 103, a memory control device 104 for controlling the work memory 103 and the frame memory 111 in response to a control signal from the CPU, and a display output control unit 112 which converts digital data stored in the frame memory 11 into signals to be delivered to a monitor 113. When the monitor 113 receives signals converted by the display output control unit 112, the monitor 113 produces graphics output on the screen thereof.

Figure 2A:
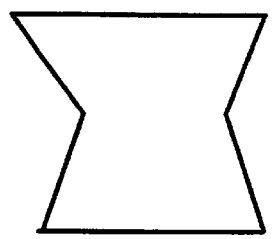
FIGS. 2a to 2g are views showing a example of a polygon which are filled in with a color by the display control device shown in FIG. 1.
Figure 2A:
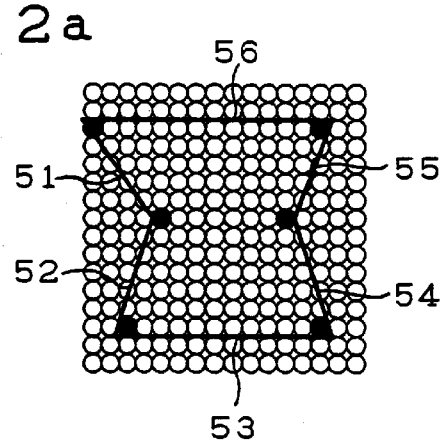
Figure 2B:
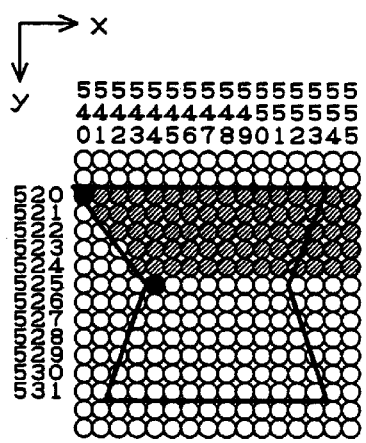
Figures 9A, 9B, 9C:
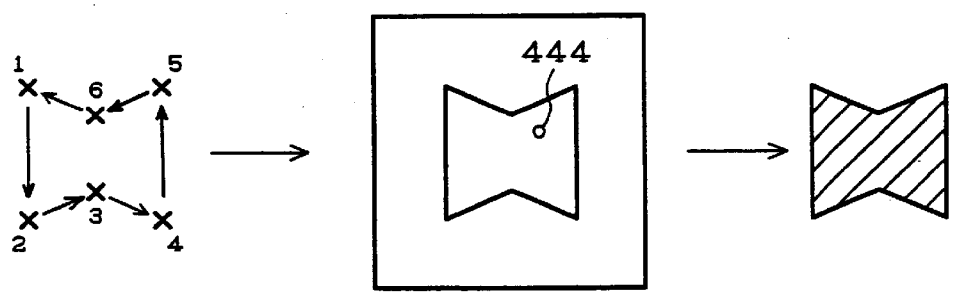
FIGS. 9a to 9c are views showing a prior art graphics drawing method implemented via software.
Figure 10:
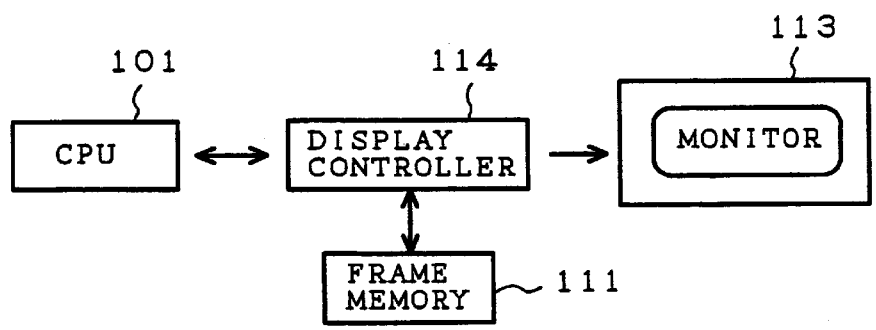
FIG. 10 is a block diagram showing the structure of a display control device using the prior art graphics drawing method shown in FIGS. 9a to 9c.

Next, a description will be made as to the operation of the display control device according to this embodiment. Referring next to FIGS. 2a to 2g, they illustrate views showing a process of drawing the same figure as that explained in the prior art drawing method with reference to FIGS. 9a to 9c, and filling the figure with a predetermined color, in accordance with the present invention. In FIG. 2b, numerals 520, 521, . . . , 531, . . . , which are running vertically, show the coordinates of horizontal rows each including a plurality of pixels running in a horizontal direction, i.e. the y coordinates of the pixels, and numerals 540, 541, 542, . . . , 555, . . . , which are running horizontally, show the coordinates of vertical rows each including a plurality of pixels running in a vertical direction, i.e. the x coordinates of the pixels. In the case of the example shown in FIGS. 2a to 2g, the x and y coordinates of the vertexes of the polygon to be drawn are (540,520), (544,525), (542,531), (553,531), (551,525), and (553,520). Line segments each of which is connected between two adjacent vertexes of the polygon are designated by reference numerals 51, 52, 53, 54, 55, and 56, as shown in FIG. 2a. For example, the line segment 51 is defined as a line connected between the vertex pixels (540,520) and (544,525). Furthermore, the line segment 51 can be approximated by these vertexes and a series of the pixels (541,521), (542,522), (543,523), and (543,524) close to the path of the line. Similarly, pixels which can be assumed to form each of the other line segments are identified. It can be understood that the pixels identified for each of the line segments are not always just on each of the line segments, as shown in FIG. 2a.

First, the description will be directed to a method of determining the inside of a figure of plane geometry such as a polygon. The method is carried out by following procedures which will be mentioned below.

(1) One-bit data of each of pixels which can be assumed to form one line segment of the contour of a polygon to be filled in with a predetermined color and one-bit data of each of pixels running behind the line segment in the direction of raster scanning are inverted without determining whether or not each of these pixels is inside or within the bounding polygon. The bit inversion is carried out sequentially across the raster from left to right and from one end of the line segment to the other end of the line segment, as shown in FIGS. 2a to 2g, for each of raster scan lines including the line segment. However, in this step, bit inversion is not done for pixels on the same raster scan line as the pixel at the other end of the line segment if the two end pixels of the line segment are on different raster scan lines. Furthermore, pixels on a line segment which have been already bit-inverted (of course, all the pixels have not been bit-inverted prior to the first bit inversion) are not bit-inverted again.

(2) Similar bit inversion is carried out for an adjacent line segment connected to the above-mentioned line segment, which was the target of the procedure (1), via the other end of the latter line segment. That is, one-bit data of each of pixels which can be assumed to form the former line segment one end of which is shared by the latter line segment, and one-bit data of each of pixels running behind the former line segment in the direction of raster scanning are inverted, with the exception of pixels on the same raster scan line as the other end of the target line segment if the two ends of this line segment are on different raster scan lines, and pixels on one line segment of the contour which have been already bit-inverted.

Following this procedure (2), bit inversion is further carried out for each of the remaining line segments.

In the example shown in FIGS. 2a to 2g, bit inversion is carried out first for each of the pixels which can be assumed to be on the line segment 51 and running behind the line segment 51 in the direction of raster scanning except the pixels on the same raster scan line as the vertex (544,525) which is one end of the line segment 51, as shown in FIG. 2b. Of course, a plurality of memory bits of the work memory 103 shown in FIG. 1 are initialized before bit inversion is done for determining the inside of a polygon so that the one-bit data of all the pixels are set to for example "0". Each of the bit-inverted pixels is indicated by a diagonally shaded dot, as shown in FIG. 2b. Thus, a plurality of pixels on each raster scan line partially including the line segment 51 are scanned sequentially, and a binary data series of binary 0 and 1 which show that one-bit data of a corresponding pixel is inverted are written sequentially into corresponding memory bits of the work memory 103.

Figure 2C:
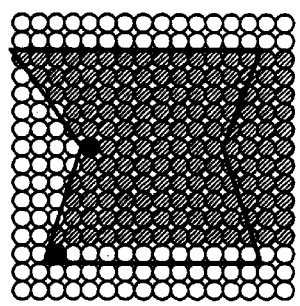
Figure 2D:
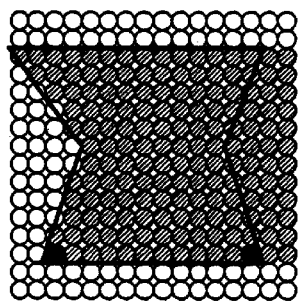
Figure 2E:
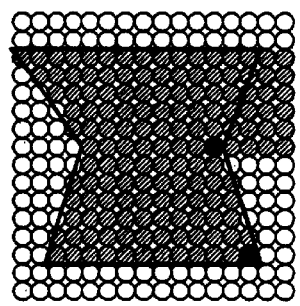
Figure 2F:
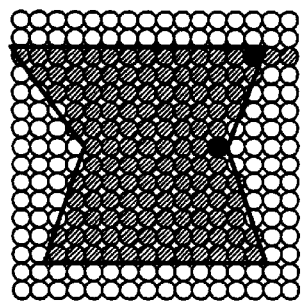
Figure 2G:
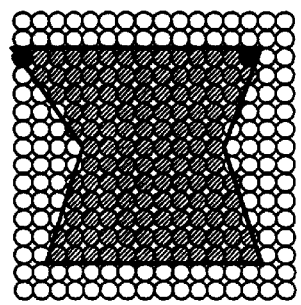
Figure 3:
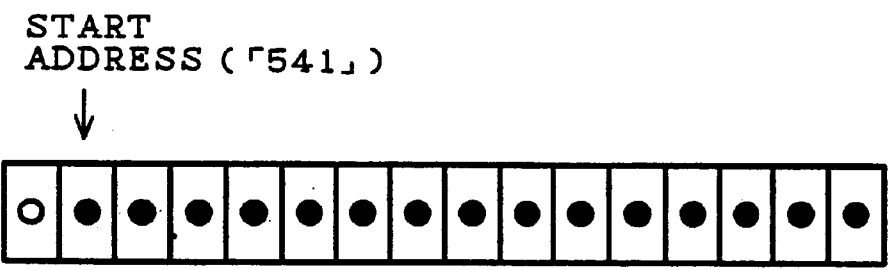
FIG. 3 is a view showing one-bit data of pixels on the raster scan line 521 shown in FIG. 2b, the one-bit data of pixels specified by a start address and higher addresses being inverted.

Referring next to FIG. 3, there is illustrated a schematic view showing the one-bit data of pixels running on the raster scan line indicated by the y coordinate of 521 in the example shown in FIGS. 2a to 2g, which are sequentially stored in the work memory 103. The x coordinate of one of plural pixels running on each raster scan line which is to be inverted first is referred to as a start address. In FIG. 3, black dots show pixels which are bit-inverted, and white dots show pixels which are not bit-inverted. It is clear from FIG. 3 that the start address of the raster scan line 521 with respect to the line segment 51 is "541", and the one-bit data of the pixel located at the start address and pixels running behind the former pixel in the direction of raster scanning are inverted. It should be noted that "inversion of data" does not mean the literal meaning of the word "inversion", but means the setting of data used for filling a graphic with a color.

Figure 4:
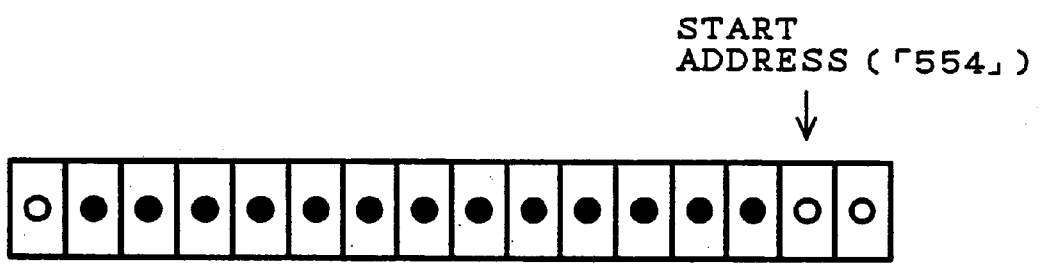
FIG. 4 is a view showing one-bit data of pixels on A the raster scan line 521 shown in FIG. 2f, the one-bit data of pixels specified by a start address and higher addresses being inverted again.

Then, bit inversion is carried out for each of the pixels on which can be assumed to be on the line segment 52 and running behind the line segment 52 in the direction of raster scanning except pixels on the same raster scan line as the vertex (542,531) which is one end of the line segment 52, as shown in FIG. 2c. And, bit inversion is further carried out for each of the pixels on which can be assumed to be on the line segment 53 and running behind the line segment 53 in the direction of raster scanning, as shown in FIG. 2d. In this case, the one-bit data of the vertex (542,531) and all pixels running behind the vertex and on the same raster scan line are inverted. Next, bit inversion is carried out for each of the pixels running behind the line segment 54 in the direction of raster scanning, as shown in FIG. 2e. Thus, the one-bit data of the pixels running behind the line segment 54 in the direction of raster scanning, i.e., located outside the polygon are inverted again, and therefore a lower half of the polygon is complete. Furthermore, bit inversion is carried out for each of the pixels running behind the line segment 55 in the direction of raster scanning, as shown in FIG. 2f. Referring next to FIG. 4, there is illustrated a schematic view showing the one-bit data of pixels running on the raster scan line indicated by the y coordinate of 521, some of which have been inverted again. As can be seen from the figure, the data of all the pixels on the raster scan line are sequentially stored in the work memory 103 while the data of the pixel at the start address "554" and pixels running behind the former pixel are inverted again.

Thus, the one-bit data of the pixels running behind the line segment 55 in the direction of raster scanning, i.e., located outside the polygon are inverted again. Finally, bit inversion is carried out for the pixels which are running behind the segment 56 in the direction of raster scanning and which were already inverted, as shown in FIG. 2g. In this case, the one-bit data of all pixels running behind the vertex (553,520) and on the same raster scan line are inverted. As a result, the polygon is complete and a preparation for filling the polygon with a predetermined color is completed. That is, a representation of the solid figure bounded by the lines 51 to 56 is achieved by setting all the pixels within the bounding polygon to the appropriate code, in the above case, the binary value "1" in the work memory.

A single bit plane, as shown in FIG. 2g, for showing the inside of a graphic such as a polygon is thus obtained and stored in the work memory 103. Therefore, if the monitor has an N×M raster, the work memory 103 requires at least N×M memory bits of a data area. This amount of the work memory 103 can be varied according to the raster size of the monitor used. Furthermore, the data width and the amount of the frame memory can be varied according to the raster size, the number of available colors, or the like of the monitor. Thereby, the drawing and filling process can be carried out optimally with efficiency.

As previously explained, the complicated determination process of determining whether or not each pixel is located inside a figure of plane geometry such as a polygon, which is conventionally implemented via software, can be implemented through a simple process of inverting the one-bit data of pixels on a part of the contour of the figure and pixels running behind the part of the contour in the direction of raster scanning. Therefore, most of the determination process can be implemented via hardware.

Furthermore, a process of drawing the contour of a figure of plane geometry and a process of determining whether or not each pixel is located within the contour of the figure and then drawing all pixels can be implemented via repeats of a single step, as can be seen from the above procedures. It can be understood that the number of determination steps and drawing steps can be therefore decreased extensively.

After bit inversion is carried out for each pixel and a single bit plane wherein the one-bit data of all the pixels within the bounding polygon are inverted is stored in the work memory 103, bit expansion is carried out in order to add color information or the like to the graphics data of a two-dimensional array stored in the work memory 103. When the data of each pixel is read out of the work memory 103, a piece of color information, which depends on whether or not the data is inverted, is added to the data and is stored into the frame memory 111.

Data to which color information is added has a massive amount of information and therefore data processing for such a massive amount of data needs a processing time proportional to the amount of data. Therefore, since color information is rarely referred to when only the shape of a figure is processed, to perform data processing on the two-dimensional graphics data array which remains having no color information and then add color information to the data array first after the above single bit plane is obtained is extremely efficient.

Next, a description will be made as to the operation of the display control device shown in FIG. 1 using the above-mentioned drawing method.

First, in order to initialize the single bit plane in the work memory 103 which shows the inside of a figure of plane geometry such as a polygon, the CPU 101 writes initial values of the graphics data of a two-dimensional array, e.g. a matrix of a plurality of binary "0" in the work memory 103 by way of the memory control device 104. Then, the CPU 101 scans each raster scan line and calculates the start address of each raster scan line, as shown in FIG. 3, indicating the x coordinate of a pixel which is to be bit-inverted first, and delivers the start address to the register circuit 102 by way of the bus 11, if at least a part of a line segment which constructs a part of the contour of the figure is included in each raster scan line. If the CPU 101 cannot obtain the start address, it delivers a default address which is bigger than the address of the end pixel of each raster scan line to the register circuit 102. In the example shown in FIGS. 2a to 2g, the CPU 101 delivers the x coordinate of 556 as the default address. At the same time when the CPU delivers the start address to the register circuit 102, a control signal is applied to the memory control device 104 for reading corresponding data from the two-dimensional graphic data stored in the work memory 103. The initial binary values of plural one-bit data in each horizontal row of the single bit plane stored in the work memory 103 are sequentially read by the bidirectional switch 109 which is controlled so as to transfer its output signal to the latch circuit 105, and are then latched by the latch circuit 105 sequentially. Each latched data in the latch circuit 105 is then applied to the selector switch 107 as a first input. Furthermore, each latched data is inverted by the inverter 106 and is applied to the selector switch 107 as a second input. That is, if the first input data is non-inverted one-bit data, e.g. binary "0" showing that a corresponding pixel is not filled in with a color, the second input data is inverted one-bit data, e.g. binary "1" showing that a corresponding pixel is filled in with a color. The output of the register circuit 102 is electrically connected to a control terminal of the selector circuit 107. The selector circuit 107 selects either the first output or the second input and outputs the selected one, according to a control signal furnished by the register 102. Accordingly, it is to be noted that the selecting operation of the selector 107 is equivalent to the graphics drawing operation. The register circuit 102 compares the start address applied thereto via the bus 11 with the address of each pixel, which is also applied to the register via the bus 12, indicating the x coordinate of each pixel on a raster scan line which is the target of bit inversion. Then, when the address of each pixel is equal to the start address, the register 102 generates a control signal at high state and delivers it to the selector 107. When the selector 107 receives the control signal at high state from the register, the selector switches from selecting the first input to selecting the second input. During scanning the same raster, the selector 107 maintains the selection. That is, the one-bit data of all pixels running behind the pixel specified by the start address and on the same raster scan line are inverted. At the start of scanning each raster scan line, the selector 107 is reset so as to select the first input.

In the case where bit inversion is carried out for the line segment 51 as shown in FIG. 2b, the selector 107 continues to select and output the first input until the address used to scan each raster scan line partially including the line segment 51 reaches the start address of each raster scan line stored in the register circuit 102. In the case of FIGS. 2b to 2d, each white dot shows that the first input has been selected by the selector. On the other hand, when the address used to scan each raster scan line reaches the start address stored in the register circuit 102, the selector 107 selects and outputs the second input. After that, the selector maintains the selection until the CPU starts to scan the next raster scan line, as mentioned above. In the case of FIGS. 2b to 2d, each diagonally-shaded dot shows that the second input has been selected by the selector. The selected output from the selector circuit 107 is written back into a corresponding memory bit of the work memory 103 by way of the latch circuit 108 and the bidirectional switch 109 in synchronization with a control signal (i.e. WRITE signal) output by the memory control device 104.

When the CPU completes the scanning for the most lower raster scan line, it starts to scan each raster scan line again from the most lower raster scan line to the most upper raster scan line, as shown in FIGS. 2e to 2g. Similarly to the above-mentioned scanning from the most upper raster scan line to the most lower raster scan line, a plurality of one-bit data from each horizontal row of the single bit plane stored in the work memory 103 are sequentially read by the bidirectional switch 109 which is switched to transfer the data read out to the latch 105 in response to a control signal applied thereto, and the plurality of one-bit data are then latched by the latch circuit 105 sequentially. Each latched data in the latch circuit 105 is applied to the first input of the selector switch 107. Furthermore, each latched data is inverted by the inverter 106 and is applied to the second input of the selector switch 107. Using a manner differs from that used for the scanning from the most upper raster scan line to the most lower raster scan line, the CPU 101 obtains the start address of each raster scan line. That is, if the first input from the latch 105 is already inverted one-bit data of a pixel which can be assumed to be on a line segment, the CPU 101 does not cause the selector 107 to select the inverted input, i.e. the second input. Therefore, when the CPU 101 scans each raster scan line and searches for a pixel which can be assumed to be on a line segment which is the next target of bit inversion and the one-bit data of the pixel has been already inverted, the CPU adds 1 to the address of the pixel to generate the start address for the raster scan line. In the example of FIG. 2e, the CPU 101 produces the start addresses of 554, 554, 553, 553, 553, and 552 for the raster scan lines indicated by the y coordinates of 531 to 526, and the one-bit data of the pixels specified by the addresses and pixels running behind the former pixels in the direction of raster scanning are inverted again.

Instead of obtaining a start address for each raster scan line, the CPU 101 can be adapted to deliver a control signal at for example high state when processing a pixel the one-bit data of which is to be inverted first among a series of pixels to be inverted and when processing the pixel which is next to a pixel at a backward end (i.e. right hand end) of the series of pixels inverted. When the control signal at high state from the CPU is applied to the selector 107 during scanning each raster scan line, the selector switches from selecting the first input to selecting the second input. After that, the selector 107 maintains the selection during scanning the same raster scan line. When scanning each raster scan line is started, the selector 107 is reset so as to select the first input.

When the graphic data of a solid figure comprised of a single bit plane having one memory bit for each pixel are thus developed in the work memory 103, the graphic data are transferred to the bit expander 110 in synchronization with a read control signal (i.e. READ signal) from the memory control device 104 in order to add color information defined by a graphic drawing instruction or the like to the graphic data. The bit expander 110 expands the one-bit data of each pixel to obtain 8-bit data, 16-bit data, or . . . , of each pixel so as to add color information to the one-bit data of each pixel. This bit-expanded data (i.e. the pixel data to which a piece of color information is added) is written into the frame memory 111 in a sequence of raster scanning in synchronization with a write signal from the memory control device 104.

The display output control device 112 converts the graphics digital data with color information stored in the frame buffer 111 into analog signals for three primary colors (red, green, and red, i.e. RGB). The RGB signals are then furnished to the monitor 113, and the figure, for example, which is filled in with a predetermined color, is displayed on the screen of the monitor.

Next, a description will be made as to a display control device according to a second embodiment of the present invention. According to this embodiment, the CPU 101 is adapted to produce an end address indicating the address of a pixel which is located next to the pixel at a backward end (i.e. right hand end) of a series of pixels which are within a bounding figure of plane geometry such as a polygon, i.e., are to be inverted, in addition to a start address as explained in the first embodiment. It can be understood that this can offer drawing at higher speed as will be mentioned below.

Figure 5:
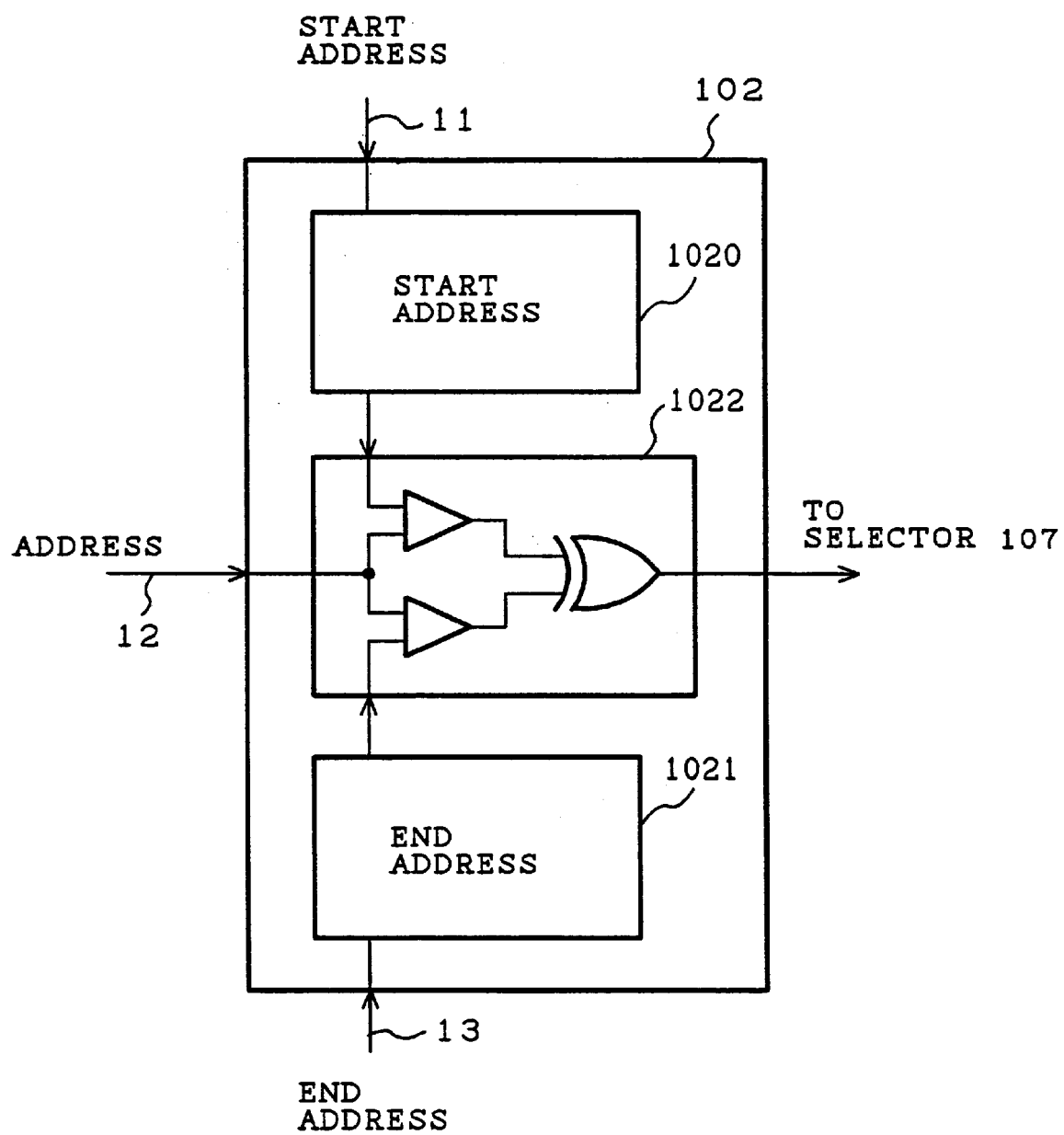
FIG. 5 is a block diagram showing the structure of a register circuit of a display control device according to another embodiment of the present invention.

The structure of the register circuit 102 according to the second embodiment differs from that of the register circuit of the first embodiment. As shown in FIG. 5, the register circuit 102 is electrically connected to the CPU which performs a software program or the like by way of buses 11, 12, and 13. The bus 11 is used in order for the CPU 101 to furnish at least one start address for each raster scan line. The bus 13 is used in order for the CPU 101 to furnish at least one end address for each raster scan line. The end address can alternatively be delivered to the register by way of the bus 11. An address for specifying a pixel which is the target of bit inversion is also furnished to the register 102 by the CPU 101 via the bus 12.

The other structure, connecting relationships between the components, and basic operation of this embodiment are the same as those of the first embodiment. For example, data transmission among the work memory 103, the bit expander 110 and the frame memory 111, and conversion from a digital representation to RGB signals are carried out similarly to those of the first embodiment, and therefore the description about the same operations will be omitted hereinafter and the description will be directed to only the different between this embodiment and the first embodiment.

Figure 6:
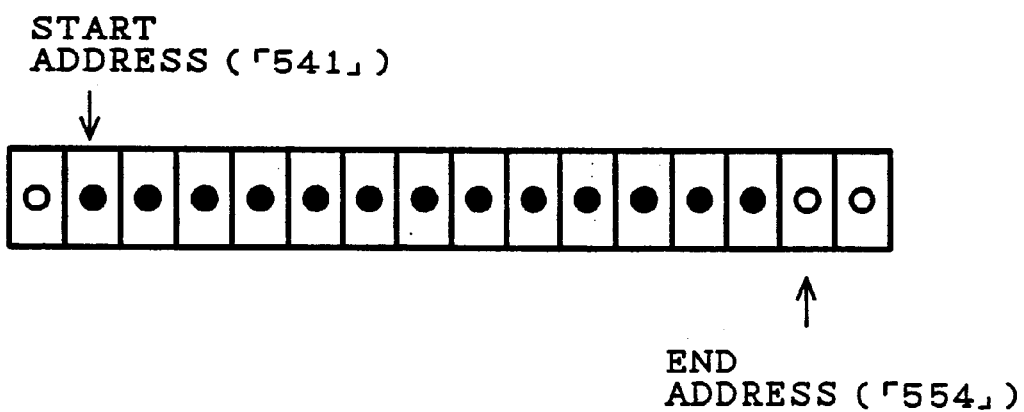
FIG. 6 is a view showing one-bit data of pixels on the raster scan line 521 as shown in FIG. 2g, the one-bit data of pixels specified by a start address to an address which is smaller than an end address by 1 being inverted.
Figure 7:
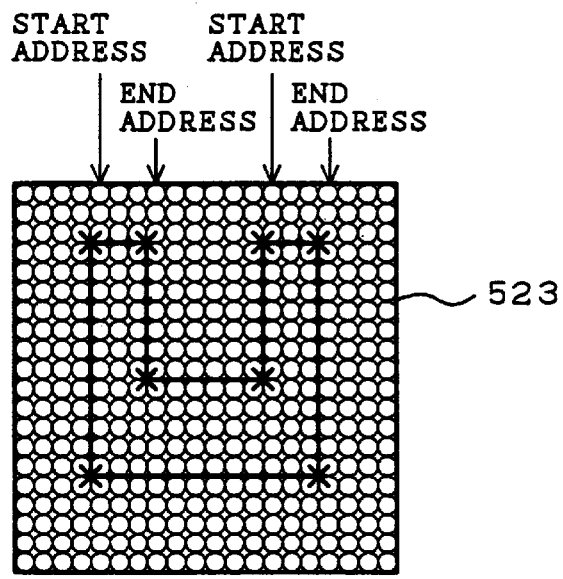
FIG. 7 is a view showing an example of a polygon which requires two pairs of start and end addresses for some raster scan lines.

First, a description will be made as to a procedure of bit inversion. Bit inversion is carried out as follows:

(1) For each raster scan line, the CPU produces a start address showing the address, i.e. the x coordinate of a pixel which is to be inverted first, that is, which is the pixel at a forward end (i.e. left hand end) of a series of pixels within the figure. If the CPU cannot search for such the forward end pixel for each raster scan line, it sets the start address to a default address which is bigger than the address of the end pixel of each raster scan line, e.g. 556. Furthermore, for each raster scan line, the CPU produces an end address showing the address of a pixel which is located next to the pixel at a backward end (i.e. right hand end) of the above series of pixels which are inside the figure. Each of the start and end addresses can be obtained by scanning each raster scan line and searching a pixel which can be assumed to be on a line segment which partially constructs the contour of the figure. For example, the x coordinate of such a pixel which is found first and can be assumed to be on a line segment is a start address. And, adding 1 to the x coordinate of another pixel found next which can be assumed to be on another line segment on the same raster scan line yields an end address. Thus, all the one-bit data of a series of pixels each specified by an address in the range from a start address to an address which is smaller than an end address by 1 are inverted every raster scan. Referring next to FIG. 6, there is illustrated a schematic view showing the one-bit data of pixels running on the raster scan line indicated by the y coordinate of 521 in the case where the same figure as in the example shown in FIGS. 2a to 2g is processed by using the method of this embodiment. The one-bit data of the pixels specified by the start address to the address which is smaller than the end address by 1, as can be seen from the figure. In the case of a polygon as shown in FIG. 7, two start addresses and two end addresses can be obtained for a raster scan line 523.

(2) The above procedure is repeated for each raster scan from the most upper raster scan line to the most lower raster scan line.

Next, the above procedures will be explained more specifically. According to this embodiment, the setting of al least one end address can be carried out when necessary for each raster scan line, as mentioned above. This makes it possible to perform bit inversion for all line segments, which can be carried out by scanning each raster scan line twice in the first embodiment, by scanning each raster scan line only once.

It could be found that according to the first embodiment, for example, in the case of the example shown in FIGS. 2a to 2g, bit inversion is carried out twice for the raster scan line indicated by the y coordinate of 521, with respect to the line segments 51 (the start address "541") and 55 (start address "541"). During the first bit inversion, the one-bit data of the pixels specified by a first start address "541" to the end (i.e. largest) address "555" are inverted, as shown in FIG. 2b. During the second bit inversion which is carried out at a different time after the first inversion is complete, the one-bit data of the pixels specified by a second start address "554" to the end address "555" are inverted, as shown in FIG. 2f. It should be noted that the bit inversion of the first embodiment is divided into two processes and, for example, they are carried out separately for the same raster scan line indicated by the y coordinate of 521. Therefore, it can be understood that if the first bit inversion process could be carried out for the raster scan line 521 in such a manner that the one-bit data of the pixels specified by the second start address "554" shown in FIG. 4 and used for the second bit inversion and higher addresses were not inverted, only the first bit inversion process could provide a desired result for the raster scan line.

To this end, according to this embodiment, start and end addresses as mentioned above can be set so as to obtain a desired result, as shown in FIG. 6. According to the second embodiment of the present invention, there is provided a mechanism for setting an end address and comparing an address specifying a pixel which is the target of bit inversion with the end address within the register circuit 102, in addition to a mechanism for setting a start address and comparing an address specifying a pixel which is the target of bit inversion with the start address. Like the display control device of the first embodiment which controls the selector circuit 107 according to the comparison between the address applied to the register and the start address, the display control device of this embodiment is adapted to control the selector circuit 107 according to the comparison between the address applied to the register and the end address. That is, when the address specifying a pixel which is to be processed reaches the end address, the display control device is adapted to cause the selector circuit 107 to selectively furnish "data not inverted" applied via the first input thereof. Graphics data thus obtained are bit-expanded and are then displayed on the screen of the monitor.

As shown in FIG. 5, the register circuit 102 in provided with a circuit 1020 for holding a start address applied thereto by the CPU, a circuit 1021 for holding an end address applied thereto by the CPU, and a circuit 1022 for determining whether or not the start address held by the start address holding circuit 1020 is equal to an address specifying a pixel which is the target of bit inversion process and determining whether or not the end address held by the end address holding circuit 1020 is equal to the specifying address. The determining circuit 1022 is adapted to output a control signal at high state when the specifying address is equal to the start or end address. When the specifying address reaches the start address, the selector 107 receives the control signal at high state from the register 102 and then switches from selecting the first input to selecting the second input. After that, the selector maintains the selection until it receives the control signal at high state again. When the specifying address reaches the end address, the selector 107 receives the control signal at high state from the register 102 and then switches from selecting the second input to selecting the first input. After that, the selector maintains the selection until it receives the control signal at high state again. At the start of scanning each raster scan line, the selector 107 is reset so as to select the first input.

Figure 8:
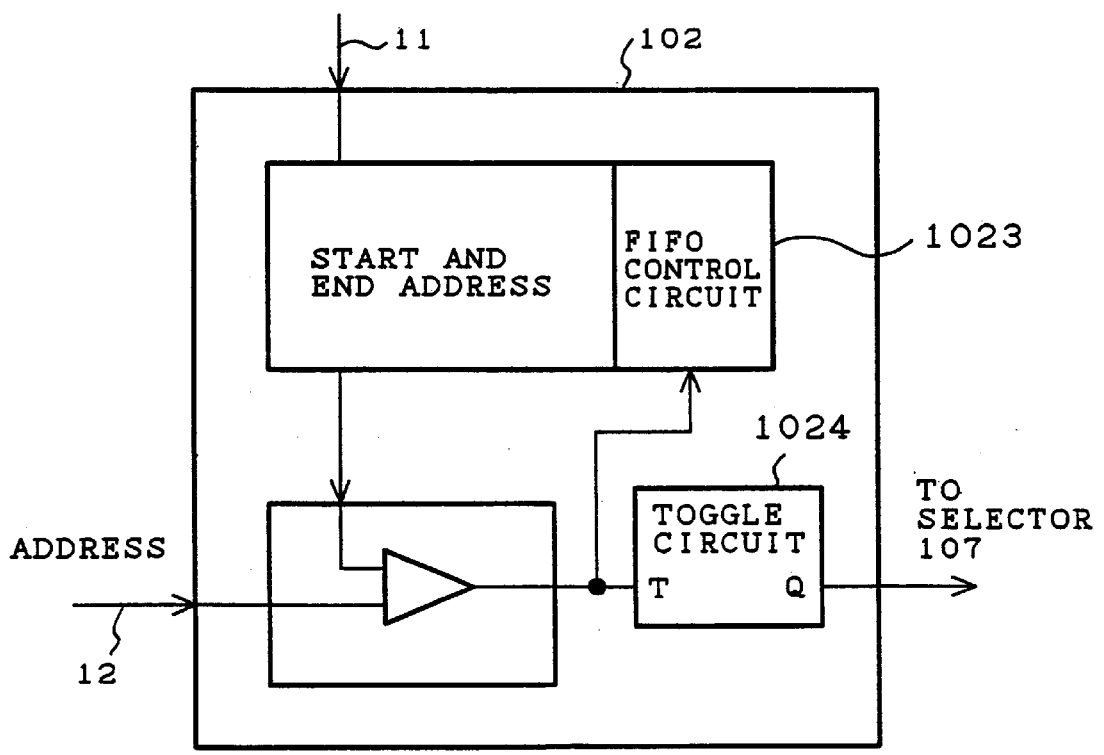
FIG. 8 is a block diagram of a variant of the register circuit of the other embodiment shown in FIG. 5.

Alternatively, the register circuit 102 can be provided with a FIFO register 1023 and a toggle circuit 1024 and can be adapted to produce a control signal when an address specifying a pixel which is the target of bit inversion process agrees with one of start and end addresses set in the register, as shown in FIG. 8.

As previously explained, the complicated determination process of determining whether each pixel is within a bounding figure of plane geometry such as a polygon, which was conventionally implemented via software, can be implemented through a simple process of inverting the one-bit data of pixels on the contour of the figure and pixels running behind the contour in the direction of raster scanning. Furthermore, even though a figure of plane geometry to be processed has a plurality of contour portions, bit inversion process can be completed for each raster scan line by performing bit inversion on each of the plural contour portions.

Next, a description will be made as to the operation of the display control device according to the second embodiment using the above-mentioned drawing method.

First, in order to initialize the single bit plane in the work memory 103 which shows the inside of a figure of plane geometry such as a polygon, the CPU 101 writes initial values of the graphics data of a two-dimensional array, e.g. a matrix of a plurality of binary "0" in the work memory 103 by way of the memory control device 104. Then, the CPU 101 scans each raster scan line and calculates the start address, as shown in FIG. 6, indicating the x coordinate of a pixel at the forward end of a series of pixels to be bit-inverted, and delivers the start address to the register circuit 102 by way of the bus 11, if at least a line segment which constructs a part of the contour of the figure is partially on each raster scan line. Similarly, the CPU calculates the end address by adding 1 to the address of the pixel at the backward end or the other end of the series of pixels to be inverted, and delivers the end address to the register circuit 102 by way of the bus 13. If the CPU 101 cannot obtain the start address, it delivers a default address which is bigger than the address of the end pixel of each raster scan line to the register circuit 102. In the case where the same figure as in the example shown in FIGS. 2a to 2g is processed by the method of this embodiment, the CPU 101 delivers the x coordinate of 556 as the start and end addresses if it cannot search for the start and end addresses for each raster scan line. At the same time when the CPU delivers the start address to the register circuit 102, a control signal is applied to the memory control device 104 for reading corresponding data from the two-dimensional graphic data stored in the work memory 103. The initial binary values of plural one-bit data in each horizontal row of the single bit plane stored in the work memory 103 are sequentially read by the bidirectional switch 109 which is controlled so as to transfer its output signal to the latch circuit 105, and are then latched by the latch circuit 105 sequentially. Each latched data in the latch circuit 105 is then applied to the selector switch 107 as a first input. Furthermore, each latched data is inverted by the inverter 106 and is applied to the selector switch 107 as a second input. That is, if the first input data is non-inverted one-bit data, e.g. binary "0" for showing that a corresponding pixel is not filled in with a color, the second input data is inverted one-bit data, e.g. binary "1" for showing that a corresponding pixel is filled in with a color. The output of the register circuit 102 is electrically connected to a control terminal of the selector circuit 107. The selector circuit 107 selects either the first output or the second input and outputs the selected one, according to the output of the register 102. Accordingly, it is to be noted that the selecting operation of the selector 107 is equivalent to the graphics drawing operation of the display control device.

As can be seen from FIG. 6, the selector 107 selects one-bit data from, the latch 105 applied to the first input thereof and outputs the selected input until an address used to scan each raster scan line reaches the start address of each raster scan line stored in the register circuit 102. A white dot of FIG. 6 which is located before the dot specified by the start address of 541 shows that the first input has been selected by the selector. When the address used to scan each raster scan line reaches the start address stored in the register circuit 102, the selector 107 selects inverted one-bit data from the inverter 106 applied to the second input thereof and outputs the selected input. Each diagonally-shaded dot shown in FIG. 6 shows that the second input has been selected by the selector and the one-bit data of a corresponding pixel has been inverted.

When the address used to scan each raster scan line reaches the end address stored in the register circuit 102, the selector 107 selects again one-bit data from the latch 105 applied to the first input thereof and outputs the selected input. Each white dot of FIG. 6 which is located at the end address of 554 or a higher address shows that the first input has been selected by the selector.

The selected output from the selector circuit 107 is written back into a corresponding memory bit of the work memory 103 by way of the latch circuit 108 and the bidirectional switch 109 in synchronization with a control signal (i.e. WRITE signal) output by the memory control device 104.

After bit inversion is carried out for each raster scan line, bit expansion is carried out for all the one-bit data stored in the work memory 103 by the bit expanding unit 110 and then the figure is displayed on the screen of the monitor 113, like the first embodiment.

As previously mentioned, the present invention offers the following advantages.

In accordance with a preferred embodiment, bit inversion of graphics data is carried out for each of contour portions of a figure of plane geometry in the direction of raster scanning and then the one-bit data of a pixel which can be assumed to form a contour portion of the figure, i.e. a line segment which partially constructs the contour of the figure and pixels running behind the former pixel in the direction of raster scanning are inverted. Thereby, a single bit plane indicating the inside of the figure can be obtained without determining whether each pixel is inside or outside the figure. Therefore, the embodiment offers the advantage of being able to draw a figure of plane geometry the inside of which is for example filled in with a predetermined color at a high speed.

In accordance with another preferred embodiment, start and end addresses which specify a series of pixels the one-bit data of which are to be inverted are set for each of raster scan lines. Thus, only one scanning throughout all raster scan lines can draw a figure of plane geometry.

Therefore, the embodiment offers the advantage of being able to draw a figure of plane geometry the inside of which is for example filled in with a predetermined color at a high speed.

Furthermore, in accordance with the present invention, data processing for determining the inside of a figure of plane geometry can be carried out using one memory bit for each pixel without adding color information to the one-bit data of each pixel. Determination of the inside of a figure of plane geometry can be carried out at a high speed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of determining the inside of a figure of plane geometry having a contour such as a polygon, comprising steps of:

initializing a single bit plane comprised of a plurality of memory bits each for storing one-bit data of each of a plurality of pixels;

scanning each of a plurality of raster scan lines and searching for at least one pixel which can be assumed to form a line segment which partially constructs the contour of the figure so as to invert the one-bit data of the pixel and also the one-bit data of pixels running behind the former pixel in a direction of raster scanning;

writing the inverted one-bit data of these pixels into corresponding ones of said plurality of memory bits in the single bit plane sequentially;

scanning again each of the plurality of raster scan lines and searching for at least another pixel which can be assumed to form another line segment which partially constructs the contour of the figure so as to invert the one-bit data of the other pixel unless the one-bit data of the other pixel has been already inverted, and further the one-bit data of pixels running behind the other pixel in the direction of raster scanning; and writing the inverted one-bit data of these pixels into corresponding ones of said plurality of memory bits in the single bit plane sequentially.

2. The method according to claim 1, wherein either of the first and second scanning steps comprises steps of obtaining a start address which specifies a pixel which can be assumed to form a line segment which partially constructs the contour of the figure, and determining whether or not the one-bit data of each pixel on each of the plurality of raster scan lines is to be inverted according to a comparison between an address specifying each pixel and the start address.

3. A method of determining the inside of a figure of plane geometry having a contour such as a polygon, comprising steps of:

initializing a single bit plane comprised of a plurality of memory bits each for storing one-bit data of each of a plurality of pixels;

scanning each of a plurality of raster scan lines and searching for at least one series of continuous pixels which can be assumed to be inside the contour of the figure so as to invert the one-bit data of each pixel included in the series of pixels; and writing the inverted one-bit data of each pixel included in the series of pixels into a corresponding one of said plural memory bits in the single bit plane;

wherein the scanning and searching step comprises steps of obtaining a start address which specifies a forward end one of the series of pixels and an end address which specifies a pixel which lies just behind a backward end one of the series of pixels in the direction of raster scanning, and determining whether or not the one-bit data of each pixel on each of the plurality of raster scan lines is to be inverted according to comparisons between an address specifying each pixel and the start and end addresses.

4. A display control device comprising:

a work memory means including at least a plurality of memory bits each for storing one-bit data indicating whether or not each pixel is inside a figure of plane geometry having a contour such as a polygon;

a control means for scanning each of a plurality of raster scan lines and searching for at least one pixel which can be assumed to form a line segment which Partially constructs the contour of the figure so as to generate a control signal for controlling bit inversion to determine the inside of the figure;

a select means for receiving the one-bit data of each pixel which is sequentially delivered by said work memory means and inverting the one-bit data so as to select one from among the original one-bit data and the inverted one-bit data according to one of the control signal from said control means, and output the selected data;

a means for writing the selected data from said selecting means into a corresponding one of the plural memory bits of said work memory means;

wherein said control means performs the scanning for said plurality of raster scan lines twice, and, in the second scanning, for each of the plurality of raster scan lines, said control means searches for at least one pixel which can be assumed to form another line segment which partially constructs the contour of the figure other than the line segment which is the target of the first scanning so as to generate and deliver the control signal to said selecting means.

5. The display control device according to claim 4, wherein for each of the plurality of raster scan lines, said control means obtains a start address which specifies a pixel at a forward end of a series of pixels which can be within the figure, i.e., the one-bit data of which are to be inverted, and compares the start address with an address specifying each pixel on each of the plurality of raster scan lines to output a comparison result as the control signal, and wherein said selecting means selects and outputs the inverted one-bit data when the comparison result shows that the specifying address is equal to or larger than the start address.

6. A display control device comprising:

a work memory means including at least a plurality of memory bits each for storing one-bit data indicating whether or not each pixel is inside a figure of plane geometry having a contour such as a polygon;

a control means for scanning each of a plurality of raster scan lines and searching for at least one pixel which can be assumed to form a line segment which partially constructs the contour of the figure so as to generate a control signal for controlling bit inversion to determine the inside of the figure;

a select means for receiving the one-bit data of each pixel which is sequentially delivered by said work memory means and inverting the one-bit data so as to select one from among the original one-bit data and the inverted one-bit data according to one of the control signal from said control means, and output the selected data;

a means for writing the selected data from said selecting means into a corresponding one of the plural memory bits of said work memory means;

wherein for each of the plurality of raster scan lines, said control means obtains a start address which specifies a pixel at a forward end of a series of pixels which can be within the figure, i.e., the one-bit data of which are to be inverted, further obtains an end address which specifies a pixel to be not inverted which lies just behind a pixel at the other end of the series of pixels, and compares the start and end addresses with an address specifying each pixel on each of the plurality of raster scan lines to output a comparison result as the control signal, and wherein said selecting means selects and outputs the inverted one-bit data when the comparison result shows that the specifying address is equal to or larger than the start address and is smaller than the end address.

* * * * *